United States Patent
White et al.

(10) Patent No.: US 9,213,811 B2
(45) Date of Patent: *Dec. 15, 2015

(54) METHODS AND SYSTEMS FOR IMPROVING THE SECURITY OF SECRET AUTHENTICATION DATA DURING AUTHENTICATION TRANSACTIONS

(71) Applicant: Daon Holdings Limited, George Town (KY)

(72) Inventors: Conor Robert White, Fairfax, VA (US); James Ahern, Dunboyne (IE); Christopher Eric Holland, Fairfax, VA (US)

(73) Assignee: DAON HOLDINGS LIMITED, George Town (KY)

( * ) Notice: Subject to any disclaimer, the term of this patent is extended or adjusted under 35 U.S.C. 154(b) by 0 days.

This patent is subject to a terminal disclaimer.

(21) Appl. No.: 13/778,181

(22) Filed: Feb. 27, 2013

(65) Prior Publication Data

US 2014/0020074 A1    Jan. 16, 2014

Related U.S. Application Data

(63) Continuation of application No. 13/546,130, filed on Jul. 11, 2012, now Pat. No. 8,453,207.

(51) Int. Cl.
| | |
|---|---|
| G06F 21/36 | (2013.01) |
| G06F 21/31 | (2013.01) |
| G06F 21/32 | (2013.01) |
| G06F 21/40 | (2013.01) |

(52) U.S. Cl.
CPC .............. *G06F 21/31* (2013.01); *G06F 21/32* (2013.01); *G06F 21/36* (2013.01); *G06F 21/40* (2013.01)

(58) Field of Classification Search
None
See application file for complete search history.

(56) References Cited

U.S. PATENT DOCUMENTS

| | | |
|---|---|---|
| 5,123,047 A | 6/1992 | Rosenow |
| 5,892,470 A | 4/1999 | Kusnick |
| 6,691,089 B1 | 2/2004 | Su et al. |
| 7,054,819 B1 | 5/2006 | Loveland |
| 8,850,534 B2 * | 9/2014 | White ............................. 726/5 |
| 8,972,739 B1 * | 3/2015 | Rosener ....................... 713/182 |
| 2002/0031230 A1 * | 3/2002 | Sweet et al. .................. 380/278 |
| 2003/0210127 A1 * | 11/2003 | Anderson .................... 340/5.27 |
| 2004/0034784 A1 | 2/2004 | Fedronic et al. |
| 2005/0171851 A1 * | 8/2005 | Applebaum et al. ............ 705/18 |
| 2006/0003738 A1 | 1/2006 | Ishikawa |
| 2006/0120707 A1 | 6/2006 | Kusakari et al. |
| 2007/0094497 A1 * | 4/2007 | O'Gorman et al. ........... 713/168 |
| 2007/0155366 A1 | 7/2007 | Manohar et al. |
| 2007/0271465 A1 | 11/2007 | Wu |
| 2007/0280456 A1 * | 12/2007 | Vadlakonda et al. .... 379/201.01 |

(Continued)

OTHER PUBLICATIONS

Extended European Search Report for EPO Application No. 12192479.9 dated Mar. 7, 2013, pp. 1-8.

*Primary Examiner* — David Pearson
(74) *Attorney, Agent, or Firm* — Kevin McDermott, Esq.

(57) ABSTRACT

A method for improving the security of secret authentication data during authentication transactions is provided that includes converting the secret authentication data of a user into scrambled secret authentication data by associating a different text-string with each item of information included in the secret authentication data. The method also includes capturing the scrambled secret authentication data with a communications device, and conducting an authentication transaction with the captured authentication data.

19 Claims, 12 Drawing Sheets

(56) References Cited

U.S. PATENT DOCUMENTS

| | | |
|---|---|---|
| 2008/0172735 A1 | 7/2008 | Gao et al. |
| 2008/0247614 A1 | 10/2008 | Abiko |
| 2008/0291060 A1 | 11/2008 | Wormald |
| 2009/0288148 A1* | 11/2009 | Headley et al. .................. 726/5 |
| 2010/0242104 A1 | 9/2010 | Wankmueller et al. |
| 2010/0275257 A1 | 10/2010 | Nishida |
| 2011/0196753 A1 | 8/2011 | Hodgdon et al. |
| 2011/0235870 A1* | 9/2011 | Ichikawa et al. .............. 382/118 |
| 2011/0310089 A1 | 12/2011 | Petersen |
| 2011/0314529 A1 | 12/2011 | Bailey, Jr. |
| 2012/0176495 A1 | 7/2012 | DeMers et al. |
| 2012/0281885 A1* | 11/2012 | Syrdal et al. .................. 382/116 |
| 2013/0015946 A1 | 1/2013 | Lau et al. |
| 2013/0227651 A1 | 8/2013 | Schultz et al. |

* cited by examiner

| Enrollment Text-String Registry ||||||| 
|---|---|---|---|---|---|---|
| A | B | C | D | E | F | G |
| H | I | J | K | L | M | N |
| O | P | Q | R | S | T | U |
| V | W | X | Y | Z | cat | dog |
| boy | bark | run | walk | ball | get | bad |
| good | lass | road | spank | farm | pig | hurt |
| nut | roof | otto | rain | snow | hot | cold |

26

| Query Registry | |
|---|---|
| 28  Private Query | Answer — 30 |
| What was your mother's maiden name? | Schultz |
| What is the name of your high school? | Heildelberg High |
| In what town were you married? | Dubrovnik |
| What is your father's middle name? | Spartacus |
| What year was your father born? | 1956 |
| In what town is your high school located? | San Diego |

| New Text-String Registry | | | | | | |
|---|---|---|---|---|---|---|
| one | mom | dad | from | that | gone | name |
| lion | Asia | Irish | lad | nose | ears | eyes |
| loser | auto | bike | tire | fast | slow | sport |
| rugby | spark | plug | oil | filter | cat | dog |
| teach | crazy | slim | ski | pass | race | light |
| ticket | apple | peach | part | ocean | army | navy |
| zippy | false | true | happy | twang | risen | wreck |
| clean | grit | enjoin | estop | joust | secret | code |

| Updated Enrollment Text-String Registry ||||||| 
|---|---|---|---|---|---|---|
| A | B | C | D | E | F | G |
| H | I | J | K | L | M | N |
| O | P | Q | R | S | T | U |
| V | W | X | Y | Z | cat | dog |
| boy | bark | run | walk | ball | get | bad |
| good | lass | road | spank | farm | pig | hurt |
| nut | roof | otto | rain | snow | hot | cold |
| true | | | | | | |

METHODS AND SYSTEMS FOR IMPROVING THE SECURITY OF SECRET AUTHENTICATION DATA DURING AUTHENTICATION TRANSACTIONS

CROSS-REFERENCE TO RELATED APPLICATIONS

This is a continuation application of U.S. patent application Ser. No. 13/546,130, filed Jul. 11, 2012, now U.S. Pat. No. 8,453,207, issued May 28, 2013.

BACKGROUND OF THE INVENTION

This invention relates generally to authentication data, and more particularly, to methods and systems for improving the security of secret authentication data during authentication transactions.

Secret Authentication (SA) data used during authentication transactions generally includes pass-phrases and answers to queries that are used to prove an individual is who he claims to be. As long as such authentication data remains secret it may be used to generate trustworthy authentication transaction results. However, imposters have been known to surreptitiously obtain such secret data by spying on individuals entering their pass-phrases or answering queries during authentication transactions, and by using sophisticated techniques such as phishing. Imposters have also been known to successfully guess such secret data through trial and error.

As a result of surreptitiously obtaining SA data of individuals, imposters may be in a position to effectively steal the identities of these individuals by obtaining additional sensitive information about these individuals such as social security numbers, credit card numbers, bank account numbers, and private medical records. Moreover, imposters have been known to conduct many types of fraudulent transactions, such as network-based transactions, with surreptitiously obtained SA data. Consequently, known authentication techniques that typically require users to enter the same SA data during authentication transactions may not adequately protect individuals against identity theft and the many types of fraudulent transactions that may result therefrom.

In an effort to eradicate such identity theft, these known authentication techniques have been supplemented with other authentication techniques by installing additional identification data on software or hardware tokens. However, generating the tokens themselves, constructing enrollment sites and systems for collecting enrollment information from individuals, procuring software and hardware to support token use, and maintaining such software and hardware systems is complex, expensive and time consuming. It has also been known to conduct authentication transactions based on SMS messaging techniques. However, imposters have also been known to circumvent such SMS messaging techniques.

BRIEF DESCRIPTION OF THE INVENTION

In one aspect, a method for improving the security of secret authentication data during authentication transactions is provided that includes converting the secret authentication data of a user into scrambled secret authentication data by associating a different text-string with each item of information included in the secret authentication data. The method also includes capturing the scrambled secret authentication data with a communications device, and conducting an authentication transaction with the captured authentication data.

In another aspect, a computer system for improving the security of secret authentication data during authentication transactions is provided that includes a device configured to simultaneously capture scrambled secret authentication data and at least one type of biometric authentication data in accordance with a same authentication data requirement during authentication transactions. Moreover, the computer system includes an authentication system that includes an authentication database.

The authentication system is configured to communicate with the device over a network, store within the database at least data records of users enrolled therein, to scramble secret authentication data by determining text-strings and associating each of the text-strings with a different item of information in the secret authentication data. Moreover, the authentication system is configured to conduct authentication transactions with the scrambled secret authentication data.

In yet another aspect, a method for improving the security of secret authentication data during authentication transactions is provided that includes capturing scrambled secret authentication data and at least one type of biometric data simultaneously from a user with a communications device. The scrambled secret authentication data includes at least one new text-string and at least one text-string included in a personal authentication lexicon of the user. The method also includes conducting an authentication transaction with the at least one new text-string and the at least one text-string, and conducting a biometric authentication transaction with the at least one text-string when the authentication transaction operation successfully authenticates the user. Further, the method includes adding the at least one new text-string to the personal authentication lexicon of the user after successfully biometrically authenticating the user.

BRIEF DESCRIPTION OF THE DRAWINGS

FIG. 3 is a diagram illustrating an exemplary query registry;

FIG. 4 is a diagram illustrating an exemplary new text-string registry;

DETAILED DESCRIPTION OF THE INVENTION

Figures 1, 2:
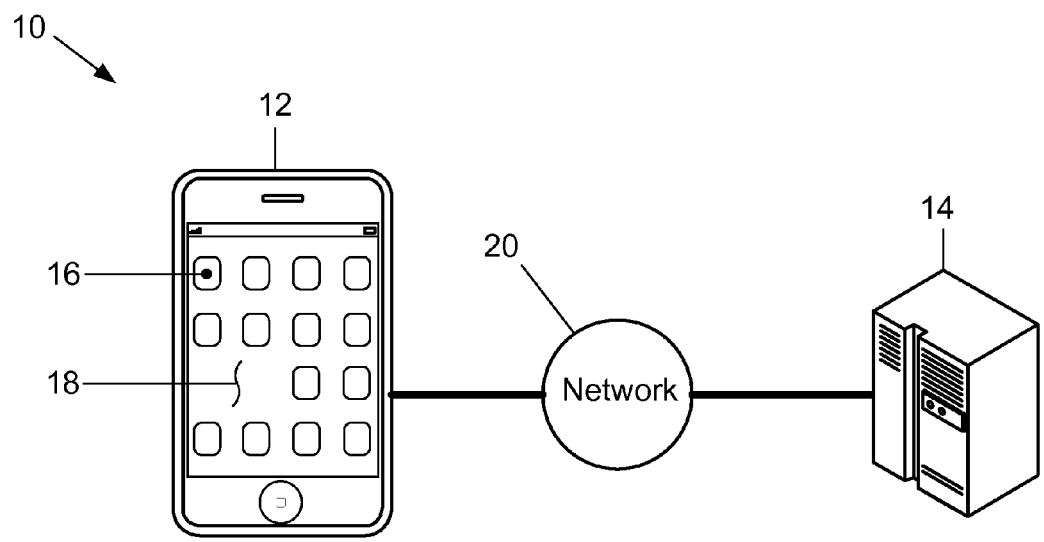
FIG. 1 is a block diagram of an exemplary embodiment of an Authentication Transaction Computer system for improving the security of secret authentication data during authentication transactions.
FIG. 2 is a diagram illustrating an exemplary enrollment text-string registry.

FIG. 1 is an expanded block diagram of an exemplary embodiment of an Authentication Transaction Computer (ATC) System 10 for improving the security of secret authentication data during authentication transactions. More specifically, the ATC system 10 includes a communications device 12 and an Authentication Computer (AC) System 14. The device 12 is associated with a user.

The communications device 12 is a smart phone that stores applications and data therein, and displays at least one of text and images. The device 12 may include buttons and icons 16 for at least entering commands and invoking applications stored therein, and a display screen 18 such as, but not limited to, a Liquid Crystal Display (LCD) that displays at least one of text and images. Moreover, the device 12 may include cameras (not shown) and a microphone (not shown). The applications may cause the device 12 to perform at least the functions described herein. Although the device 12 is a smart phone in the exemplary ATC system 10, the device 12 may alternatively be any device capable of at least storing data, displaying at least one of text and images, and capturing and transmitting data. Such other devices include, but are not limited to, a portable cellular phone, a tablet computer, a laptop computer, a personal computer, any type of portable communications device having wireless capabilities such as a personal digital assistant (PDA), entertainment device and gaming consoles. Entertainment devices include, but are not limited to, televisions, and gaming consoles include, but are not limited to, Xbox 360 and Nintendo Wii.

The device 12 is configured to communicate with the AC system 14, other systems (not shown), and devices (not shown) over a communications network 20. The communications network 20 is a 4 G communications network. Alternatively, the communications network 20 may be any wireless network including, but not limited to, 3G, Wi-Fi, Global System for Mobile (GSM), Enhanced Data for GSM Evolution (EDGE), and any combination of a local area network (LAN), a wide area network (WAN) and the Internet.

The device 12 may be used to capture secret authentication (SA) data and to capture biometric authentication data during authentication transactions. The device 12 may also transmit captured SA data and biometric authentication data to the AC system 14. Furthermore, the device 12 may process captured biometric authentication data prior to transmitting it to the AC system 14. For example, the device 12 may create a biometric template from captured biometric data and then transmit the biometric template to the AC system 14. Although the ATC system 10 includes one device 12, the ATC system 10 may alternatively include any number of devices 12 that are each associated with a same or different user.

The AC system 14 includes components such as, but not limited to, a web server, a database server, an application server, a directory server and a disk storage unit that may be used to store any kind of data. The disk storage unit may store at least one database such as, but not limited to, an authentication database. The application server stores applications therein that cause the AC system 14 to perform the functions described herein. The AC system 14 also includes a database management server and an authentication server. The database management server may be used to facilitate transferring data to and from the disk storage device. The authentication server performs matching of any feature or information associated with users to authenticate the identity of users during authentication transactions as described herein. The AC system 14 is also configured to communicate with the device 12, other systems (not shown), and devices (not shown) over the network 20. Other systems (not shown) that the AC system 14 and the device 12 may communicate with include computer systems of service providers such as, but not limited to, financial institutions, medical facilities, national security agencies, and merchants.

The authentication database stores at least authentication data of each of a plurality of users in enrollment data records. The authentication data may be any kind of information that may be used to authenticate users such as, but not limited to, SA data of a user, Global Positioning System (GPS) coordinates, biometric authentication data of the user, and any combination thereof. The biometric authentication data may correspond to any biometric characteristic desired to be used as a basis of authentication such as, but not limited to, voice, face, finger, iris, palm, and electrocardiogram, and any combination of voice, face, finger, iris, palm, and electrocardiogram. The biometric authentication data may take any form such as, but not limited to, audio recordings, photographic images, and video streams.

The enrollment data record of each authorized user stored in the AC system 14 includes data such as, but not limited to, the SA data, enrollment biometric data, enrollment biometric templates, and personal data of the user. SA data includes, but is not limited to, private pass-phrases and answers to private queries. Pass-phrases are generally alphabetic, numeric, or alphanumeric text-strings that include any number of characters and are obtained from users during enrollment in the AC system 14. The Personal Identification Number (PIN) of a user is a numeric type of pass-phrase. The enrollment biometric data is raw biometric data obtained from the user during enrollment in the AC system 14. The enrollment biometric data for each user is processed during enrollment to generate at least one enrollment biometric template, for each respective user, which may be used by the AC system 14 to conduct authentication transactions. The enrollment biometric data may also be used by the AC system 14 to conduct authentication transactions. Personal data includes any demographic information regarding a user including, but not limited to, a user's name, gender, age, date-of-birth, address, citizenship and marital status. Each enrollment data record may also include any kind of data that may be used to authenticate the identity of users as described herein.

Although the SA data and biometric authentication data are described herein as being obtained from each user during enrollment in the AC system 14, the SA data and biometric authentication data may be obtained by other methods such as, but not limited to, automatically reading or extracting them from identity documents or from legacy databases included in other computer systems. Likewise, biometric templates corresponding to the biometric authentication data may be obtained by other methods such as, but not limited to, automatically reading or extracting the biometric templates from identity documents or from legacy databases included in other computer systems. Templates corresponding to desired biometric authentication data may be obtained in addition to, or instead of, the desired biometric data itself. Such other legacy database systems include, but are not limited to, systems associated with corporate and governmental personnel records, motor vehicle administrations, social security administrations, welfare system administrations, financial institutions and health care providers. Such identity documents include, but are not limited to, passports and driver's licenses. By extracting SA data, desired biometric authentication data or biometric templates from a legacy database or identity document, and storing the extracted data in the AC system 14, user authentication data may be provided during enrollment therein without the user having to directly provide authentication data.

The AC system 14 may also store configurable authentication policies, some of which may be used to determine data that is to be captured or obtained from users during enrollment in the AC system 14, and others which may be used to determine an authentication data requirement. The authentication data requirement is the authentication data desired to be captured from users during authentication transactions. The authentication data requirement may be any type of authentication data, or any combination of different types of authentication data and may be determined in any manner by the AC system 14.

The AC system 14 may store a configurable text-string registry for each user enrolled therein. The enrollment text-string registry of each user is different. The AC system 14 determines different text-strings to associate with items of information included in SA data using the text-string registries. For example, the AC system 14 may randomly select different text-strings from the text-string registries. Moreover, the AC system 14 may determine which text-strings to use in any manner including, but not limited to, executing algorithms. Such algorithms may determine the least recently used text-strings in the registries as the text-strings to use, or such algorithms may generate different text-strings that may each be associated with a different character of a pass-phrase. The AC system 14 may also store other registries therein including, but not limited to, a configurable query registry for each user enrolled therein, and determine answers to private queries in any manner including, but not limited to, selecting the answers from respective query registers of the users.

Although the communications device 12 and the AC system 14 are included in the exemplary ATC system 10, alternative ATC systems 10 may not include the AC system 14. In such other alternative ATC systems 10, the communications device 12 may store the same information that may be stored in the AC system 14 in the exemplary ATC system 10. Such information includes, but is not limited to, enrollment data records of users associated with the device 12, authentication policies, enrollment text-string registries of users associated with the device 12, a new text-string registry, and query registries. Moreover, in such alternative ATC systems 10, the communications device 12 is configured to perform the functions of the AC system 14 for improving the security of SA data during authentication transactions as described herein. For example, the communications device 12 may perform functions including, but not limited to, matching of any feature or information associated with users to authenticate the identity of users, determining text-strings to associate with items of information included in SA data using text-string registries, and determining whether captured scrambled secret authentication data matches text-strings included in an authentication data capture request message.

The device 12 and the AC system 14, respectively, each include a processor (not shown) and a memory (not shown). It should be understood that, as used herein, the term processor is not limited to just those integrated circuits referred to in the art as a processor, but broadly refers to a computer, an application specific integrated circuit, and any other programmable circuit. It should be understood that the processors execute instructions, or computer programs, stored in the respective memories (not shown) of the device 12 and the AC system 14. The above examples are exemplary only, and are thus not intended to limit in any way the definition and/or meaning of the term "processor."

The respective memories (not shown) in the device 12 and the AC system 14 can be implemented using any appropriate combination of alterable, volatile or non-volatile memory or non-alterable, or fixed, memory. The alterable memory, whether volatile or non-volatile, can be implemented using any one or more of static or dynamic RAM (Random Access Memory), a floppy disc and disc drive, a writeable or re-writeable optical disc and disc drive, a hard drive, flash memory or the like. Similarly, the non-alterable or fixed memory can be implemented using any one or more of ROM (Read-Only Memory), PROM (Programmable Read-Only Memory), EPROM (Erasable Programmable Read-Only Memory), EEPROM (Electrically Erasable Programmable Read-Only Memory), an optical ROM disc, such as a CD-ROM or DVD-ROM disc, and disc drive or the like.

Each of the memories (not shown) can be a computer-readable recording medium used to store data, respectively, in the device 12 and the AC system 14. Moreover, each of the respective memories (not shown) can be a computer-readable recording medium used to store computer programs or executable instructions that are executed, respectively, by the device 12 and the AC system 14. Furthermore, the memories (not shown) may include smart cards, SIMs or any other medium from which a computing device can read computer programs or executable instructions. As used herein, the term "computer program" is intended to encompass an executable program that exists permanently or temporarily on any computer-readable recordable medium that causes the computer or computer processor to execute the program and thus causes the computer to perform a function. Applications as described herein are computer programs.

FIG. 2 is a diagram illustrating an exemplary enrollment text-string registry 22 stored in the AC system 14 for a user enrolled therein. The enrollment text-string registry 22 includes forty-nine text-strings 24. Alternatively, the text-string registry 22 may include any number of text-strings 24. Each text-string 24 may include any number of alphabetic characters. Thus, many different text-strings may be generated. For example, text-strings may be generated to be a lone alphabetic character, a group of alphabetic characters, words formed from groups of alphabetic characters, and phrases and sentences formed from words. The words may be of any length and have any number of syllables. The sentence "The rain in Spain falls mainly in the plain," may be a lone text-string 24. Each text-string 24 included in the registry 22 is different. The text-string registry 22 may be stored in the AC system 14 in any manner. Text-strings 24 may also be added to the registry 22 subsequent to enrollment.

FIG. 3 is a diagram illustrating an exemplary query registry 26 stored in the AC system 14 for a user enrolled therein. The query registry 26 includes six queries 28 and corresponding answers 30. Alternatively, the query registry 26 may include any number of different queries 28, and corresponding answers 30, that facilitate improving the security of SA data during authentication transactions as described herein.

The answers 30 are provided by users during enrollment in the AC system 14 and are to be provided by users during knowledge-based authentication transactions as well as text dependent or text independent speaker recognition authentication transactions. Knowledge-based authentication transactions typically require a user to provide the answer 30 corresponding to a query 28 asked during an authentication transaction. When the answer 30 provided by the user is correct, the user may be successfully authenticated; otherwise, not. Queries 28 and corresponding answers 30 may be added to the registry 26 subsequent to enrollment.

The text-strings 24 are recited by users during authentication transactions, and during enrollment in the AC system 14 to capture biometric authentication data for storage in the enrollment data records of the respective users. Biometric authentication data that may be captured by the device 12 as the result of reciting the text-strings 24 during authentication or enrollment includes, but is not limited to, voice and face biometric data. The face biometric data may be captured in a photograph or as a video stream. Face biometric data captured as a video stream may include, but is not limited to, mouth and iris movements. Other biometric authentication data may be captured in photographs, video streams, or by other methods while reciting the text-strings, however such other biometric authentication data is not the result of reciting the text-strings. Such other biometric data includes, but is not limited to, fingerprint and iris. Thus, the text-strings 24 may be used to at least facilitate generating and storing biometric authentication data of each user in the AC system 14 that can be used for conducting authentication transactions.

Regarding text-dependent voice biometric data, because text-dependent authentication techniques are inherently more accurate than text-independent authentication techniques, reciting any one of, or any combination of, the text-strings 24 during an authentication transaction facilitates increasing the accuracy of voice biometric data authentication results. However, text-dependent and text-independent authentication techniques may be used to conduct voice biometric authentication transactions.

When the authentication data requirement during an authentication transaction requests SA data, a different text-string may be associated with each item of information included in the SA data to create a scrambled or secretly coded version of the SA data. The items of information in a pass-phrase are the characters of the pass-phrase, and the items of information in the answer 30 to a private query 28 are the words in the answer 30. Consequently, for example, when the SA data is the PIN type pass-phrase 2013, the text-strings "Farm," "Ball," "Hot," and "Pig," may be associated with the characters 2, 0, 1, and 3, respectively, to thus convert the SA data 2013 into the scrambled or secretly coded SA data of "Farm Ball Hot Pig." As another example, when "Schultz" is the SA data answer 30 to a query 28 for the maiden name of the user's mother, the text-string "Spank" may be associated with the word "Schultz" to thus convert the word "Schultz" into the scrambled or secretly coded SA data of "Spank." Likewise, when the SA data answer 30 to a query 28 is "San Diego," the text-strings 24 "Bark" and "Road," respectively, may be associated with "San" and "Diego" to thus convert the words "San" and "Diego" into the scrambled or secretly coded SA data of "Bark Road."

SA data may be converted into any number of scrambled or secretly coded versions by associating a different text-string 24 with each different item of information in the SA data for each different authentication transaction. Consequently, users may recite a different scrambled or secretly coded version of the SA data during each authentication transaction. Furthermore, instead of manually entering the SA data on a keypad or through other such mechanism, users may recite the scrambled or secretly coded SA data. Thus, it should be understood that the text-string registry 22 of each user constitutes a dictionary, or lexicon, of the text-strings 24 personal to each user that may be used to scramble or secretly code SA data of users to protect their SA data from imposters during authentication transactions. Consequently, the text-string registry 22 of each individual user may be referred to as a Personal Authentication Lexicon (PAL).

Reciting differently scrambled or secretly coded SA data for each different authentication transaction facilitates reducing the chances imposters will be able to surreptitiously obtain the SA data of individuals. Thus, doing so facilitates improving the security of such SA data and facilitates reducing the chances that an imposter will steal identities of individuals. Because the scrambled SA data is different for each authentication transaction, the scrambled or secretly coded version of the SA data to be captured is not known in advance to an imposter and thus appears unpredictable. Consequently, due to the number of different combinations that may be determined by the AC system 14, the scrambled SA data constitutes an unpredictable condition injected into authentication transactions by the AC system 14 that facilitates making it more difficult for imposters to successfully spoof the AC system 14 and steal identities. An unpredictable condition is a condition required for successful authentication that an imposter cannot effectively accurately anticipate.

Further, biometric data generated as a result of reciting the scrambled or secretly coded SA data may be used with the scrambled or secretly coded SA data itself during a same authentication transaction, to provide authentication data for conducting multi-factor authentication transactions and thereby facilitate improving the matching accuracy performance of authentication systems. Thus, it should be understood that by virtue of generating and reciting scrambled or secretly coded SA data as described herein, the device 12 may simultaneously capture additional different authentication data.

FIG. 4 is a diagram illustrating an exemplary new text-string registry 32 including new text-strings 34, not included in the enrollment text-string registry 22, that may be recited by a user during an authentication transaction. The new text-string registry 32 includes fifty-six new text-strings 34. However, the new text-string registry 32 may alternatively include any number of new text-strings 34. The new text-string registry 32 constitutes a dictionary of new text-strings 34 that may be added to the enrollment text-string registry 22 of each user enrolled in the AC system 14. The AC system 14 determines, in any manner, which new text-strings 34, if any, are to be used for scrambling or secretly coding SA data.

The new text-strings 34 may be generated in the same manner as the text-strings 24. Consequently, new text-strings 34 may also be generated to be a lone alphabetic character, a group of alphabetic characters, words formed from groups of alphabetic characters, and phrases and sentences formed from words. The new text-strings 34 included in the registry 32 are different from each other and are different from the text-strings 24 included in the registry 22.

Figures 5, 6:
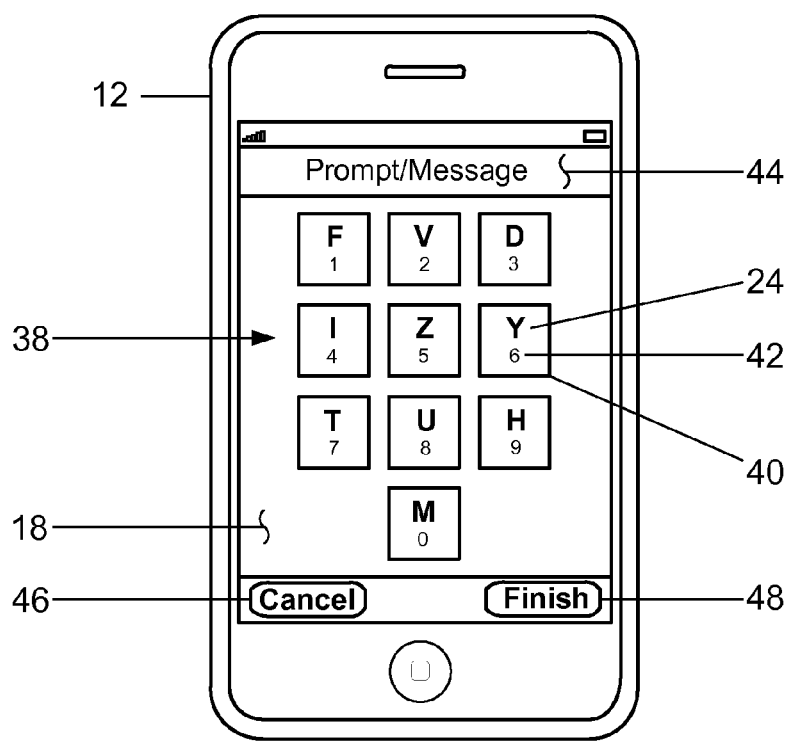
FIG. 5 is a diagram illustrating an exemplary updated enrollment text-string registry.
FIG. 6 is a plan view of a communications device illustrating an exemplary keypad including an exemplary text-string associated with each key.

FIG. 5 is a diagram illustrating an exemplary updated enrollment text-string registry 36 similar to the registry 22 shown in FIG. 2. However, the registry 36 includes a new text-string 34. More specifically, the updated enrollment text-string registry 36 includes the text-string "True" which was added from the new text-string registry 32, as well as the same enrollment text-strings 24 included in the enrollment text-string registry 22. The updated enrollment text-string registry 36 may also be referred to as the PAL.

FIG. 6 is an enlarged plan view of the communications device 12 illustrating an exemplary keypad 38. More specifically, the keypad 38 includes ten keys 40 that are each associated with different key data 42. The key data 42 includes numbers from 0 to 9. Alternatively, the key data 42 may include any numbers, letters, or any combination of numbers and letters. Each key 40 is also associated with a different exemplary text-string 24. Thus, each item of key data 42 is associated with a different exemplary text-string 24. Specifically, the exemplary text-strings F, V, D, I, Z, Y, T, U, H, and M are associated with the key data 42 numbers 1-9 and 0, respectively. Each item of key data 42 also corresponds to the item of information in the SA data associated with the text-string.

During authentication transactions based on SA data in the form of a PIN type pass-phrase, users generally enter their PIN by pressing the keys 40 having key data 42 corresponding to that in their PIN. Associating each item of key data 42 with a different text-string 24 enables users to enter their PIN by reciting the text-strings 24 corresponding to the characters of their PIN, and thus facilitates converting SA data into scrambled or secretly coded SA data. By virtue of reciting the text-strings 24 corresponding to items of key data 42, which items of key data 42 correspond to the items of information in their SA data, users recite the scrambled or secretly coded version of their SA data.

The keypad 38 also includes a message area 44 for displaying messages to users of the device 12, a cancel button 46, and a finish button 48. The cancel button 46 is activated to cancel an operation being performed by the device 12, and the finish button 48 is activated to at least indicate that an operation is finished. The text-string 24 associated with each key 40 is different for each SA data-based authentication transaction to facilitate increasing the unpredictability of the SA data to an imposter and thus the difficulty of covertly obtaining SA data simply by listening during authentication transactions.

Figure 7:
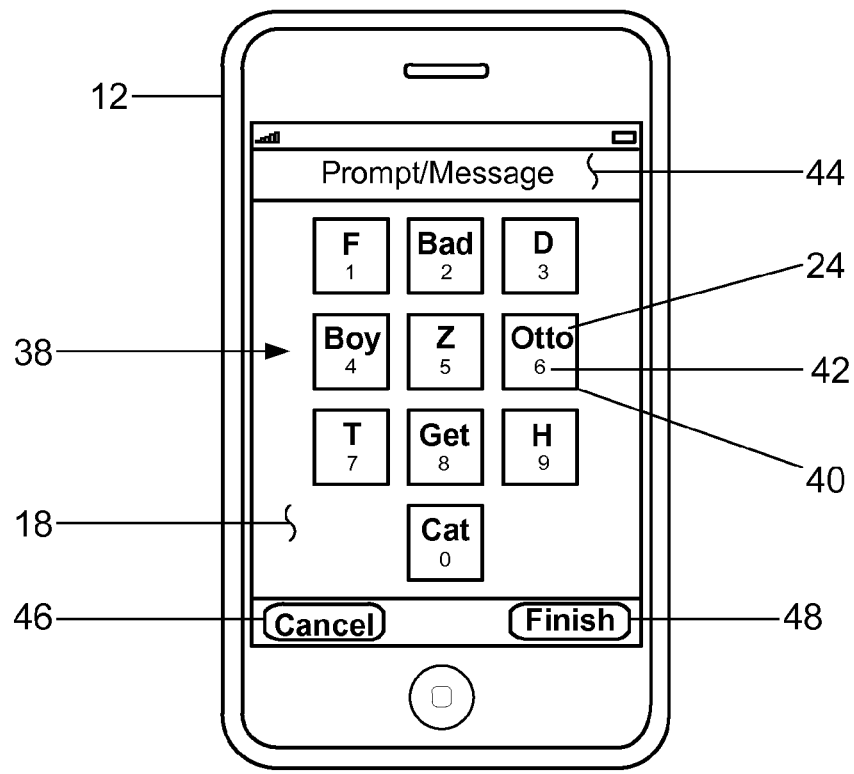
FIG. 7 is a plan view of the communications device illustrating the exemplary keypad as shown in FIG. 6, however, some of the keys are associated with text-strings that constitute words.
Figure 8:
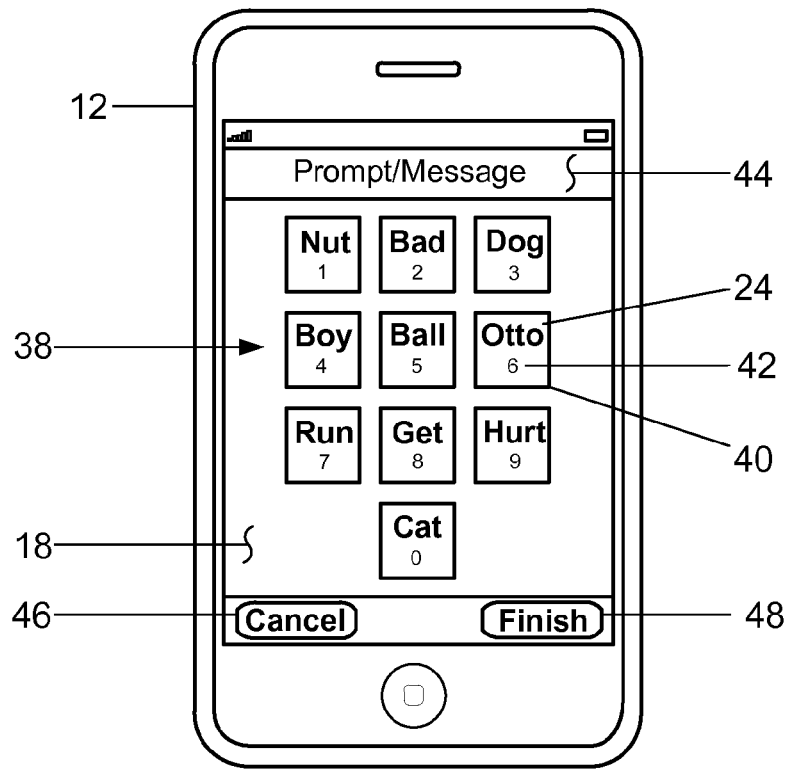
FIG. 8 is a plan view of the communications device illustrating the exemplary keypad as shown in FIG. 6, however all of the text-strings are words.

The information shown in FIGS. 7 and 8 is the same information shown in FIG. 6 as described in more detail below. As such, features illustrated in FIGS. 7 and 8 that are identical to features illustrated in FIG. 6 are identified using the same reference numerals used in FIG. 6.

FIG. 7 is an enlarged plan view of the device 12 illustrating the exemplary keypad 38 as shown in FIG. 6. However, some of the keys 40 are associated with different exemplary text-strings 24 that constitute words. More specifically, the text-strings F, Bad, D, Boy, Z, Otto, T, Get, H, and Cat are associated with the items of key data 1-9 and 0, respectively, and illustrate that text-strings 24 recited during authentication transactions based on SA data may include both individual alphabetic characters as well as words.

FIG. 8 is an enlarged plan view of the device 12 illustrating the exemplary keypad 38 as shown in FIG. 6. However, all of the exemplary text-strings 24 are words. More specifically, the text-strings Nut, Bad, Dog, Boy, Ball, Otto, Run, Get, Hurt, and Cat are associated with the items of key data 1-9 and 0, respectively, and illustrate that text-strings 24 recited during authentication transactions based on SA data may include all words.

The information shown in FIGS. 9 to 13 is the same information shown in FIG. 8 as described in more detail below. As such, features illustrated in FIGS. 9 to 13 that are identical to features illustrated in FIG. 8 are identified using the same reference numerals used in FIG. 8.

Figure 9:
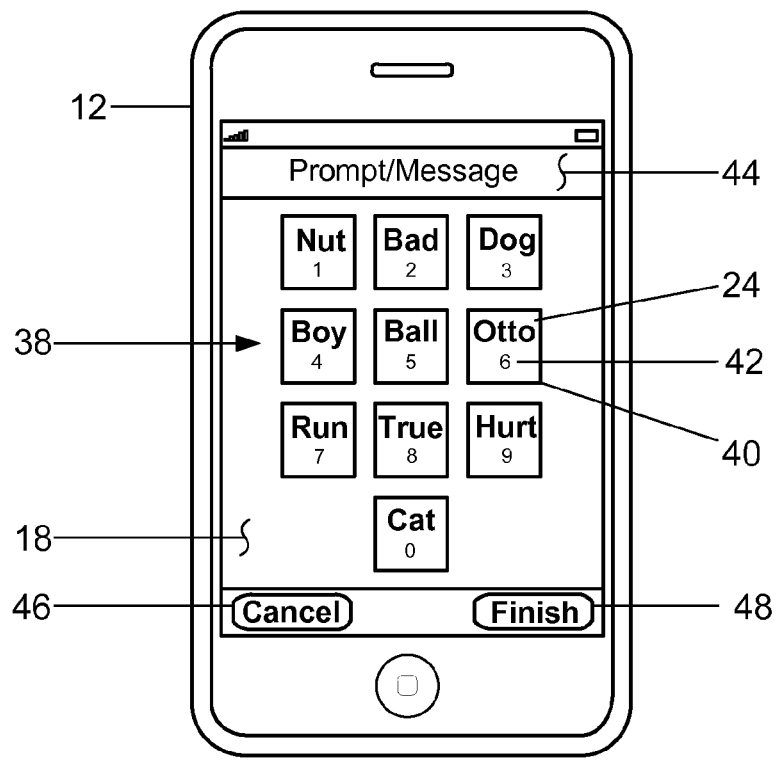
FIG. 9 is a plan view of the communications device illustrating the exemplary keypad as shown in FIG. 8, however a new text-string is included.

FIG. 9 is an enlarged plan view of the communications device 12 illustrating the exemplary keypad 38 and text-strings 24 as shown in FIG. 8. However, a new text-string 34 is associated with key data 8 is "True," instead of the text-string 24 "Get." After successfully authenticating a user, the new text-string 34 may be added to the enrollment text-string registry 22 as an enrollment text-string 24, and the captured biometric authentication data of the new text-string 34 may be added to the enrollment data record of the user.

Figure 10:
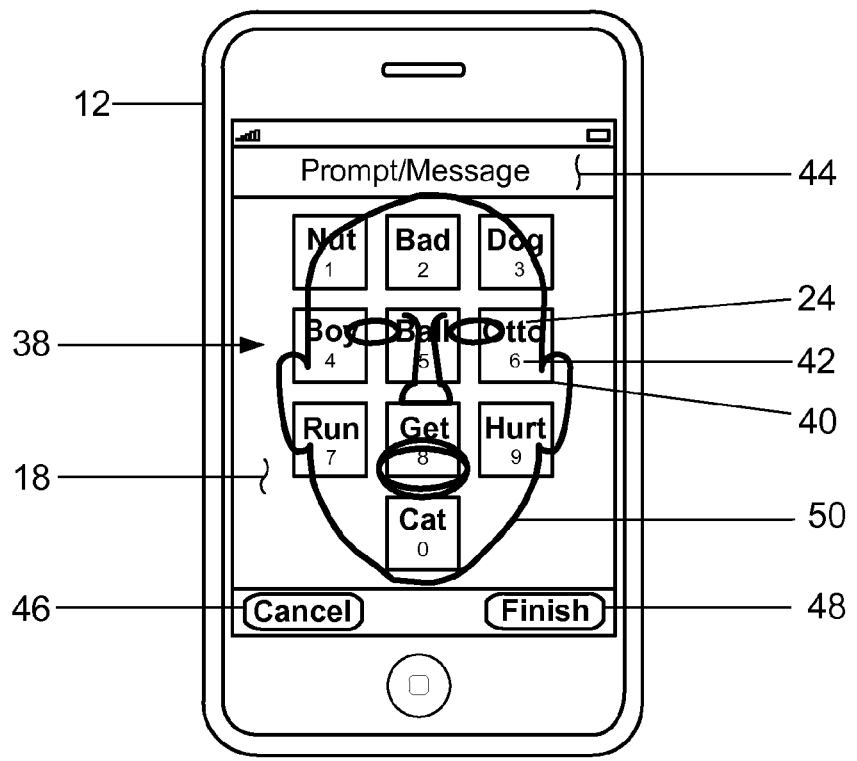
FIG. 10 is a plan view of the communications device illustrating the exemplary keypad and text-strings as shown in FIG. 8, further including an image of a user.

FIG. 10 is an enlarged plan view of the communications device 12 illustrating the exemplary keypad 38 and text-strings 24 as shown in FIG. 8, further including an image 50 of the user's face. More specifically, as the user recites the scrambled SA data, an image of the user's face is captured by the device 12 and is shown on the screen 18 with the keypad 38. The keypad 38 may be superimposed on the image 50, or the image 50 may be superimposed on the keypad 38, such that the keypad 38 and image 50 overlap. The image 50 may be a photograph or a video stream of the user's face. Moreover, the image 50 constitutes captured face biometric authentication data. The captured face biometric data may be used with the captured scrambled SA data to conduct a multi-factor authentication transaction. Moreover, when voice biometric data is also captured as a result of reciting the scrambled SA data, the voice and face biometric data may be used to conduct a biometric authentication transaction and the captured scrambled SA data may be used to conduct a knowledge-based authentication transaction. By virtue of conducting both biometric and knowledge-based authentication transactions, a multi-factor multi-modal authentication transaction is conducted.

Figure 11:
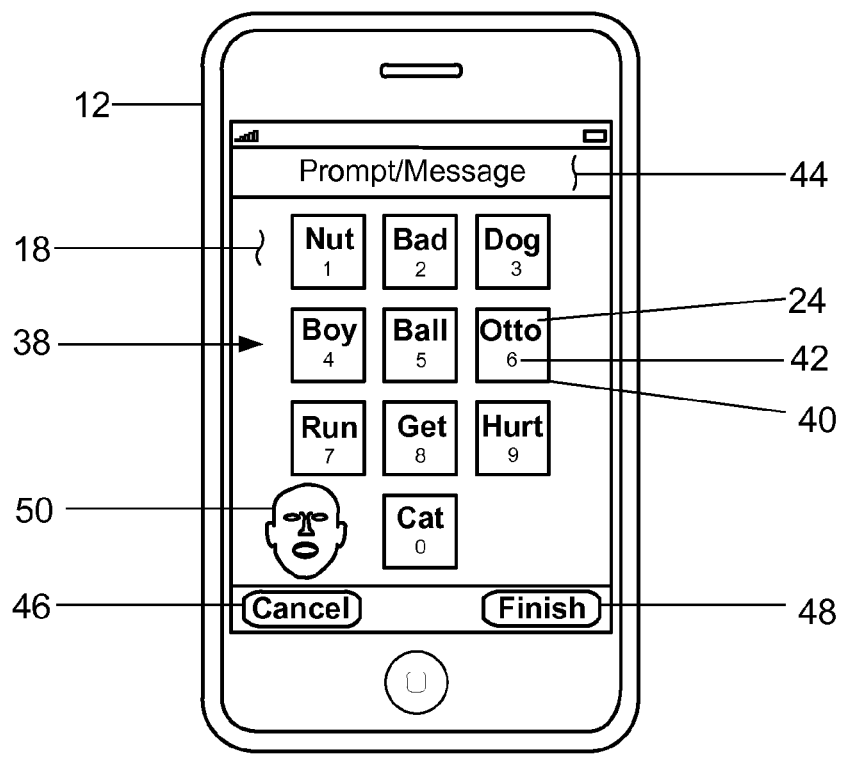
FIG. 11 is a plan view of the communications device illustrating the exemplary keypad and text-strings as shown in FIG. 8, further including an image of the user.

FIG. 11 is an enlarged plan view of the communications device 12 illustrating the exemplary keypad 38 and text-strings 24 as shown in FIG. 8, further including the image 50 positioned on the screen 18 such that the keypad 38 and image 50 do not overlap. Thus, the image 50 and keypad 38 are not superimposed one upon the other while the user recites the scrambled SA data. The image 50 may be of any size and be positioned in any manner on the screen 18 that facilitates capturing authentication data as described herein. Although the image 50 is shown on the screen 18 while capturing face biometric authentication data as described herein with regard to FIGS. 10 and 11, face biometric authentication data may be captured by the device 12 without displaying the image 50 of the user while reciting the scrambled SA data.

Figure 12:
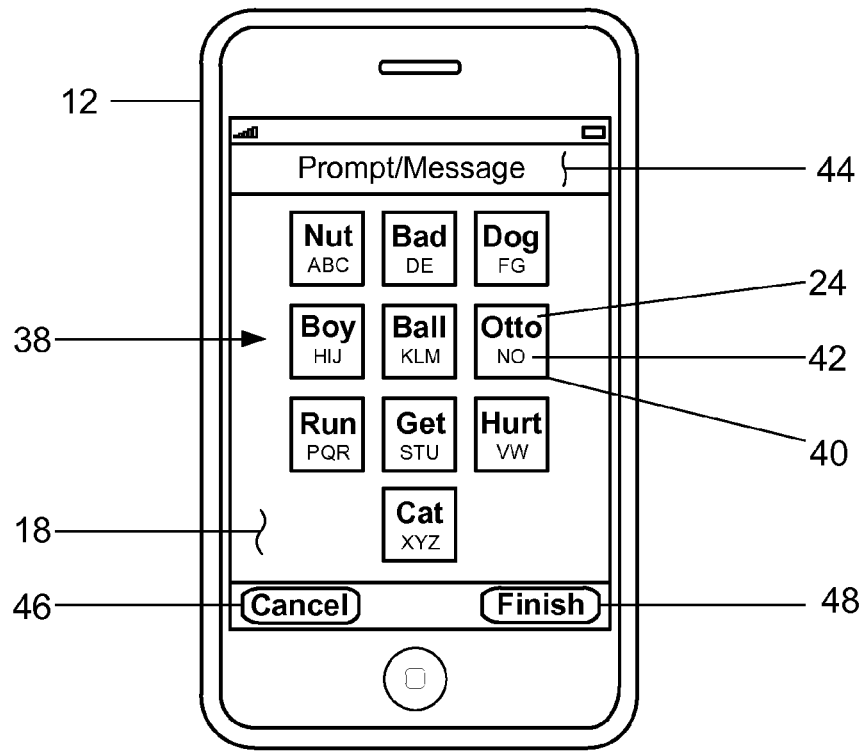
FIG. 12 is a plan view of the communications device illustrating the exemplary keypad and text-strings as shown in FIG. 8, however the keys are associated with letters instead of numbers.

FIG. 12 is an enlarged plan view of the communications device 12 illustrating the exemplary keypad 38 and text-strings 24 as shown in FIG. 8. However, the key data 42 associated with each key 40 includes a different series of letters, instead of a different number. Moreover, the letters included in each series of letters are associated with the same text-string 24. Associating each key 40 with key data 42 including a series of letters, and associating the letters of each series with the same text-string 24, facilitates converting alphabetic pass-phrase type SA data into scrambled or secretly coded SA data. For example, when the SA data is the alphabetic pass-phrase "XQBFT," the text-strings "Cat," "Run," "Nut," "Dog," and "Get," may be associated with the characters "X," "Q," "B," "F," and "T," respectively, to thus convert the alphabetic pass-phrase "XQBFT" into the scrambled or secretly coded SA data of "Cat Run Nut Dog Get."

Figure 13:
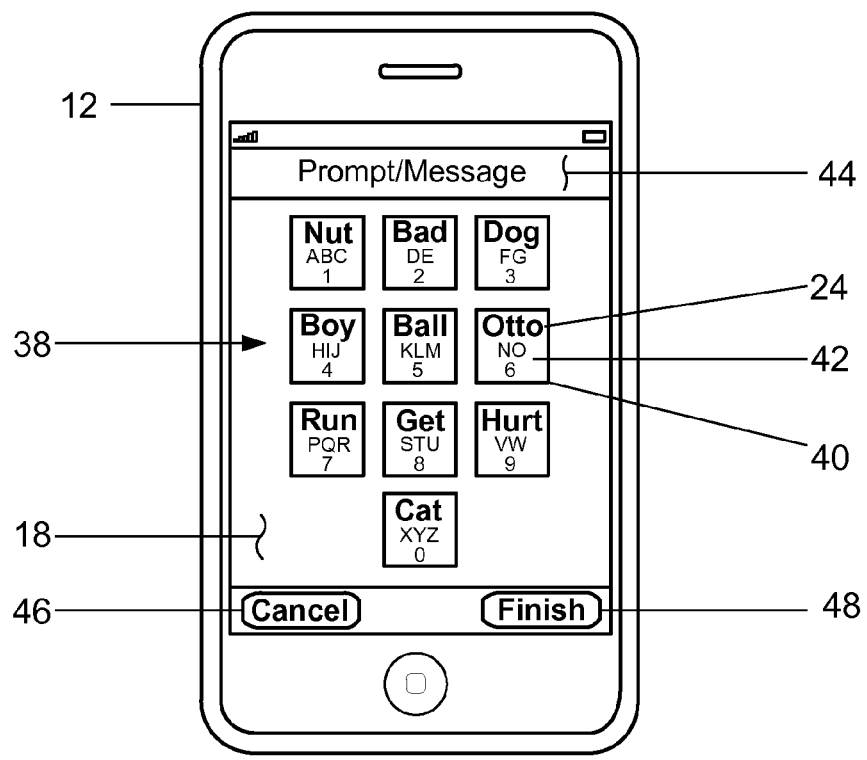
FIG. 13 is a plan view of the communications device illustrating the exemplary keypad and text-strings as shown in FIG. 8, however the keys are also associated with letters.

FIG. 13 is an enlarged plan view of the communications device 12 illustrating the exemplary keypad 38 and text-strings 24 as shown in FIG. 8. However, the key data 42 associated with each key 40 includes a different number and a different series of letters. Moreover, the key data 42 of each key 40 is associated with a text-string 24 to facilitate converting SA data in the form of alphanumeric pass-phrases into scrambled or secretly coded SA data. For example, when the SA data is the alphanumeric pass-phrase "ZELVG4," the text-strings "Cat," "Bad," "Ball," "Hurt," "Dog," and "Boy" may be associated with the characters "Z," "E," "L," "V," "G" and "4," respectively, to thus convert the SA data "ZELVG4" into the scrambled or secretly coded SA data of "Cat Bad Ball Hurt Dog Boy."

The keypad 38 is displayed on the screen 18 to facilitate converting SA data into scrambled or secretly coded SA data. Instead of displaying the keypad 38, any type of conversion mechanism may alternatively be displayed on the screen 18 to facilitate converting SA data into scrambled SA data as described herein. Such mechanisms include, but are not limited to, Qwerty keyboards.

Figure 14:
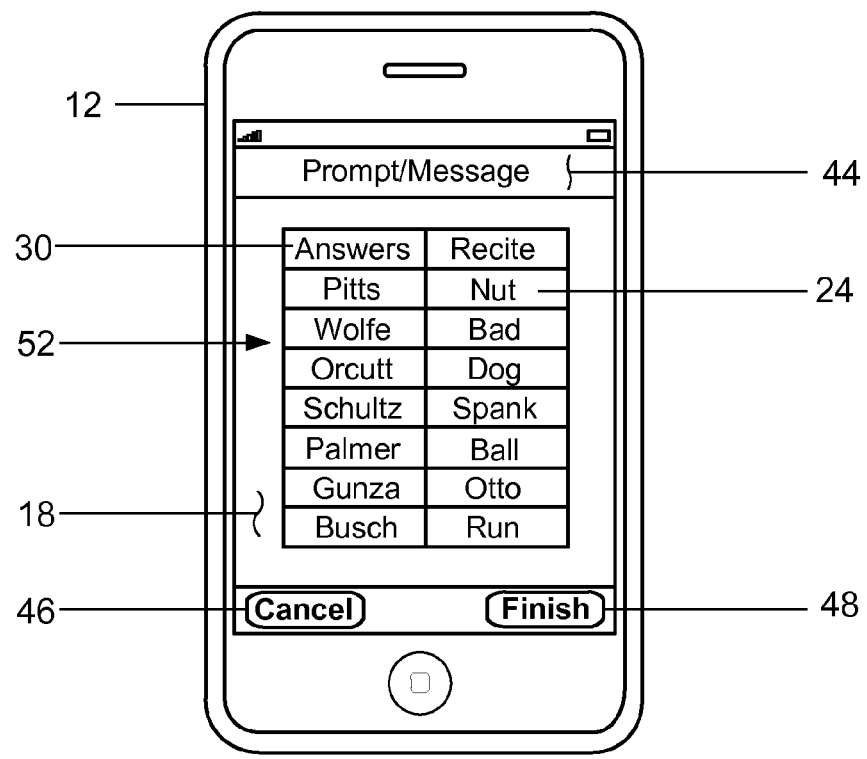
FIG. 14 is a plan view of the communications device illustrating an exemplary list of answers and corresponding text-strings.

FIG. 14 is an enlarged plan view of the communications device 12 illustrating an exemplary list 52 of answers 30 and corresponding text-strings 24 to be used during authentication transactions. The answers 30 include dummy answers 30 as well as the answer 30 to a query 28 provided by the user during enrollment in the AC system 14. Associating the answer 30 provided by the user during enrollment with a corresponding text-string 24 converts the provided answer 30 into scrambled or secretly coded SA data. Including dummy answers 30 associated with corresponding text-strings 24 in the list 52 facilitates increasing the unpredictability of the SA data to an imposter and thus increases the difficulty for imposters to surreptitiously obtain SA data of users.

Individuals are required to prove who they claim to be during authentication transactions conducted under many different circumstances. For example, individuals may be required to prove their identity to passport control during an authentication transaction conducted in person at an airport. Alternatively, individuals may be requested to prove their identity to a merchant while attempting to remotely purchase a product from a merchant system over the internet. The entity requesting verification of an individual's claim of identity is referred to herein as the requesting entity. In the previous examples, passport control and the merchant are requesting entities.

Figure 15:
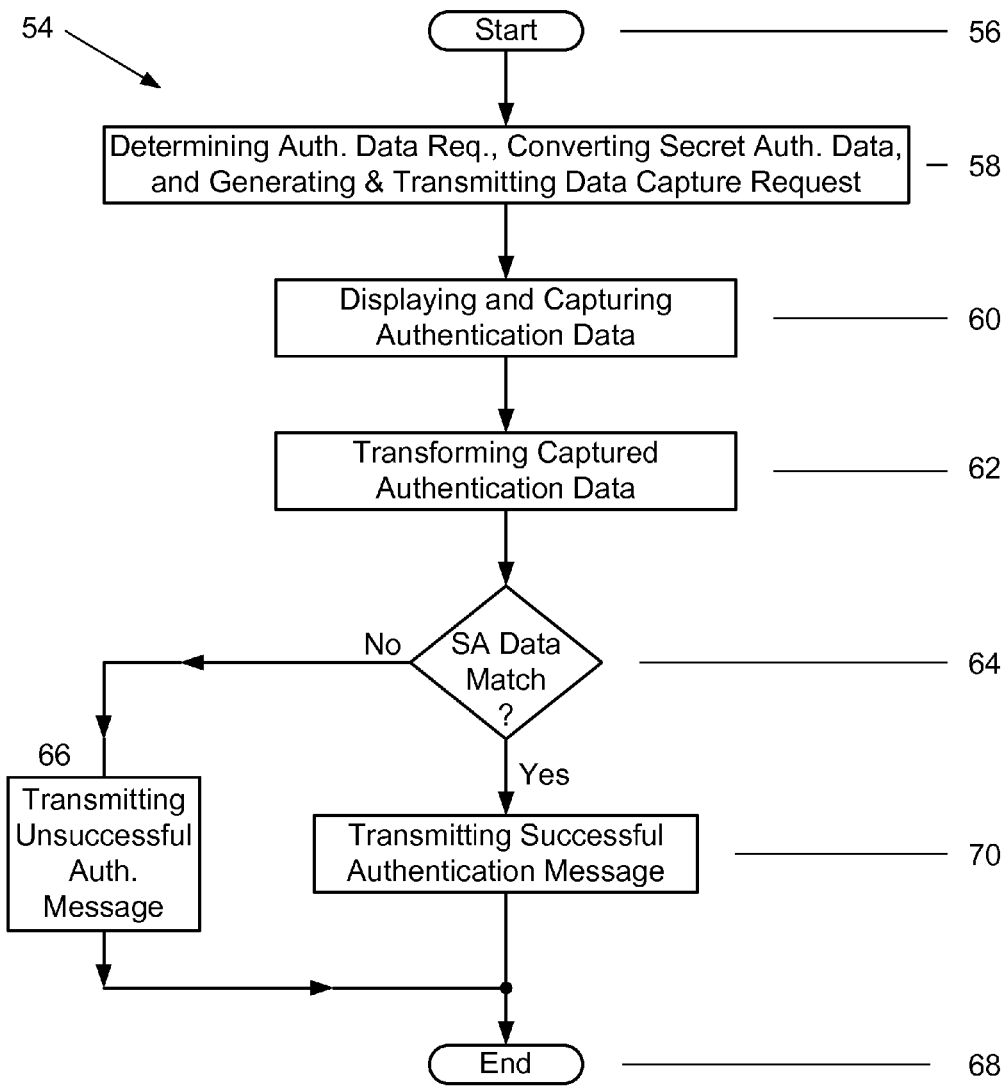
FIG. 15 is a flowchart illustrating an exemplary process for improving the security of secret authentication data during authentication transactions.

FIG. 15 is a flowchart 54 illustrating an exemplary process used by the ATC system 10 for improving the security of SA data during authentication transactions. For the ATC system 10, the process starts 56 when the AC system 14 receives a request to authenticate the user of the device 12 from a requesting entity. In response, the AC system 14 continues by determining an authentication data requirement 58 for authenticating the user. The authentication data requirement is SA data in the form of a PIN type pass-phrase of the user. Specifically, the PIN type pass-phrase is 2587.

The AC system 14 continues by determining the SA data of the user to be 2587, determining a different text-string 24 for each item of information included in the SA data, determining key data 42 that corresponds to each item of information, and determining a dummy text-string 24 for each item of key data 42 that does not correspond to an item of information. The text-strings 24 determined for the items of information included in the SA data are referred to herein as authentication text-strings. The authentication text-strings are "Bad," "Ball," "Get," and "Run," which correspond to the items of information "2," "5," "8," and "7," and to the key data 42 numbers 2, 5, 8, and 7. The dummy text-strings 24 are "Nut," "Dog," "Boy," "Otto," "Hurt," and "Cat," which correspond to items of key data 1, 3, 4, 6, 9, and 0. Next, the AC system 14 continues by converting the SA data into scrambled SA data by associating each of the different authentication text-strings with the respective item of information included in the SA data. Thus, the scrambled or secretly coded SA data is "Bad Ball Get Run." The authentication text-strings and dummy text-strings 24 are also associated with the respective key data 42.

Next, the AC system 14 continues by generating an authentication data capture request message 58 that includes at least the authentication and dummy text-strings, and corresponding key data 42, and by transmitting the message 58 to the communications device 12. In alternative processes, the entire keypad 38 including the keys 40 associated with the key data 42, authentication text-strings, and dummy text-strings may be transmitted as an image in the authentication data capture request message.

After receiving the authentication data capture request message, the device 12 continues by displaying 60 the keypad 38 such that the received authentication and dummy text-strings are each associated with the corresponding key 40 and key data 42, as shown in FIG. 8. Moreover, the device 12 displays a message in the message area 44 instructing the user to recite the text-strings corresponding to the items of information in his SA data. By reciting the text-strings corresponding to the items of information in his SA data, the user recites the scrambled SA data. After reading the message, the user continues by capturing authentication data 60 from his self with the device 12 by reciting the text-strings associated with key data 42 that corresponds to each item of information of the SA data, in the order the items of information appear in the SA data. By doing so, the user captures recitations of the scrambled SA data "Bad Ball Get Run." Thus, the captured authentication data includes the scrambled SA data. Next, the user continues by activating the button 48 which causes the device 12 to continue by transmitting the captured authentication data to the AC system 14. The device 12 may alternatively transmit the captured authentication data automatically instead of in response to activation of the button 48.

After receiving the captured authentication data, the AC system 14 continues by conducting an authentication transaction with the captured authentication data. The AC system 14 continues by transforming 62 the captured authentication data into SA data in the form of a PIN type pass-phrase. More specifically, the AC system 14 continues by transforming 62 the captured authentication data of "Bad," "Ball," "Get," and "Run" into the items of information "2," "5," "8," and "7," respectively, and by determining that the transformed authentication data corresponds to the SA data of 2587.

Next, processing continues by determining whether the transformed authentication data matches 64 the SA data stored therein for the user by comparing the transformed authentication data against the stored SA data. When the transformed authentication data and stored SA data do not match 64, processing continues by transmitting a message 66 to the requesting entity and the device 12 indicating that the user was not successfully authenticated. Next, processing ends 68. However, when the transformed authentication data and stored SA data match 64, processing continues by transmitting a message 70 to the requesting entity and the device 12 indicating that the user was successfully authenticated, then processing ends 68.

Although the SA data is a PIN type pass-phrase in the exemplary process, in alternative processes conducted in accordance with the flowchart 54 illustrated in FIG. 15, the SA data may be an answer 30 to a query 28. In such alternative processes, after receiving the authentication request from the requesting entity, the AC system 14 continues by determining the authentication data requirement is SA data in the form of an answer to a query. Next, the AC system 14 continues by determining a query 28, an answer 30 to the query 28 provided by the user during enrollment, dummy answers 30 to the query 28, a different text-string corresponding to each item of information included in the provided answer 30, and a different text-string corresponding to each item of information in each different dummy answer 30. The provided answer 30 is the SA data. In this alternative exemplary process the query 28 is "What was your mother's maiden name?" The provided answer 30 was "Schultz," thus the SA data is the provided answer 30 "Schultz." "Schultz" is also the item of information included in the SA data for this alternative exemplary process. In other alternative processes the provided answers 30 to queries 28 may include any number of items of information.

The AC system 14 continues by determining that the text-string corresponding to "Schultz" is "Spank," and converting the SA data into scrambled SA data by associating the text-string "Spank" with "Schultz." Thus, the scrambled or secretly coded version of the SA data "Schultz" is "Spank." Moreover, the AC system 14 determines that the dummy answers 30 are "Pitts," "Wolfe," "Orcutt," "Guy," "Gunza," and "Busch," and their respective text-strings are "Nut," "Bad," "Dog," "Ball," "Otto," and "Run." Next, the AC system 14 continues by generating an authentication data capture request message 58 and transmitting the message 58 to the communications device 12. The authentication request message includes at least the query 28, the provided answer 30 and corresponding text-string, and the dummy answers 30 and corresponding text-strings.

After receiving the message, the device 12 continues by displaying the list 52 such that the provided and dummy answers 30 are associated with their corresponding text-strings, as shown in FIG. 13. Moreover, the device 12 displays the query 28 "What is your mother's maiden name?" in the message area 44 to prompt the user into reciting the text-strings corresponding to the items of information included in his SA data. Next, the user continues by capturing authentication data 60 from his self by reciting the text-strings associated with the items of information of the SA data, in the order the items of information appear in the SA data. Specifically, the user recites "Spank." Thus, the captured authentication data is the scrambled SA data. Next, processing continues by transmitting the captured authentication data to the AC system 14 as described in the exemplary process.

After receiving the captured authentication data, the AC system 14 continues by transforming the captured authentication data 62 into an answer. More specifically, the AC system 14 continues by transforming the captured authentication data of "Spank" into the answer "Schultz," and by determining that the transformed authentication data corresponds to the SA data of "Schultz." Next, the AC system 14 continues by conducting operations 64, 66, 68, and 70 as described herein.

Figure 16:
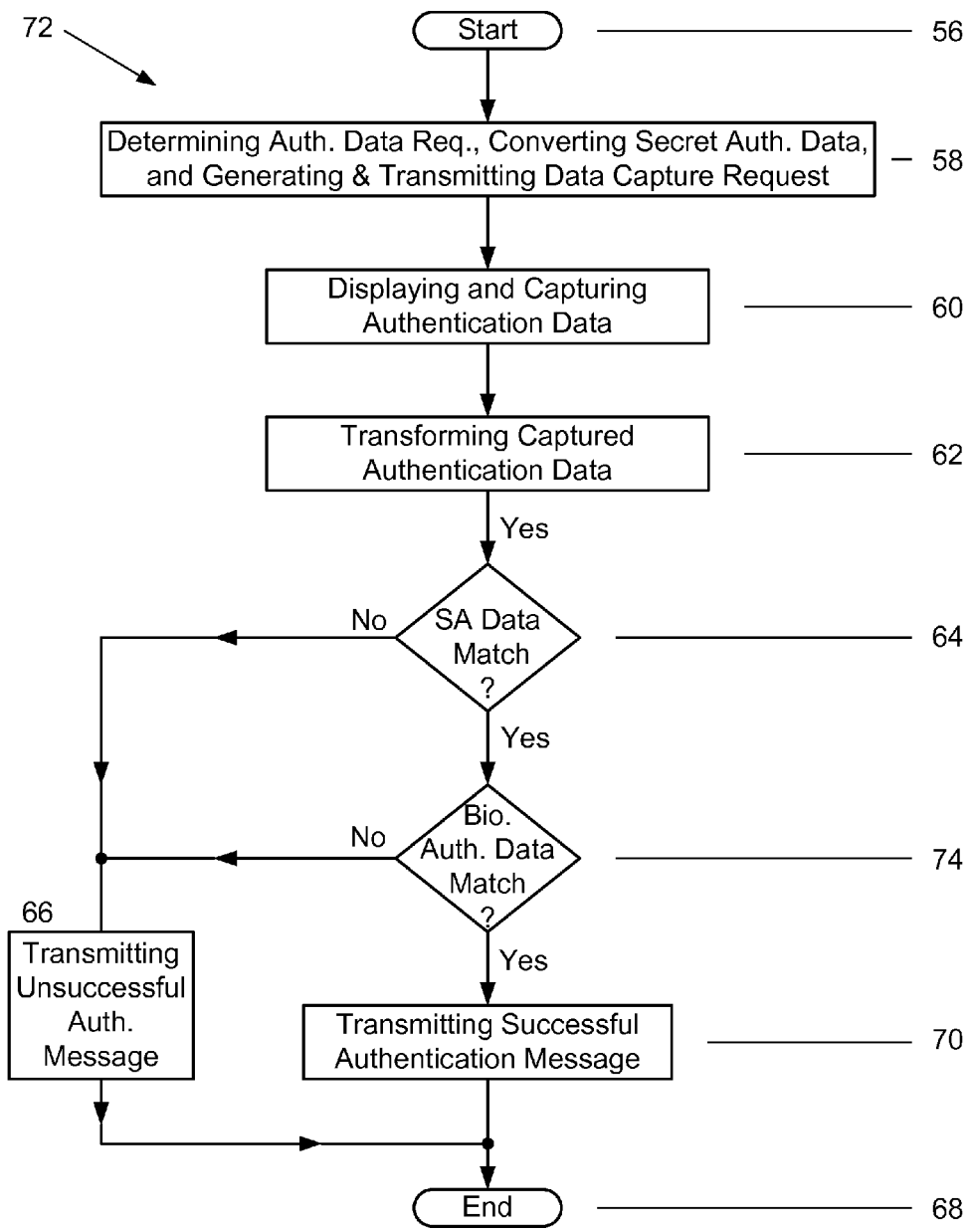
FIG. 16 is a flowchart illustrating an alternative exemplary process for improving the security of secret authentication data during authentication transactions.

The information shown in FIG. 16 is the same information shown in FIG. 15 as described in more detail below. As such, features illustrated in FIG. 16 that are identical to features illustrated in FIG. 15 are identified using the same reference numerals used in FIG. 15.

FIG. 16 is a flowchart 72 illustrating an alternative exemplary process used by the ATC system 10 for improving the security of SA data during authentication transactions. This alternative process is similar to that shown in FIG. 15. However, different types of authentication data simultaneously captured in accordance with a same authentication data requirement are used to conduct a multi-factor authentication transaction. More specifically, after receiving the captured authentication data, the AC system 14 continues processing by conducting operations 62 and 64 as described in the exemplary process. However, when the transformed authentication data and stored SA data match 64, processing continues by conducting a biometric authentication transaction 74 with the captured authentication data. It should be understood that by virtue of reciting the scrambled SA data, the user simultaneously captures biometric authentication data while capturing the scrambled SA data. Thus, two different types of authentication data are simultaneously captured in accordance with a same authentication data requirement. Consequently, in this alternative exemplary process, the captured authentication data constitutes the scrambled SA data as well as biometric authentication data.

Next, the AC system 14 continues by determining whether the captured authentication data matches 74 the enrollment data of the user stored therein. When the captured authentication data and enrollment data of the user do not match 74, processing continues by transmitting a message 66 to the requesting entity and the device 12 indicating that the user was not successfully authenticated. Next, processing ends 68. However, when the captured authentication data and the enrollment data of the user match 74, the identity of the user is successfully authenticated. Next, processing continues by transmitting a message 70 to the requesting entity and the device 12 indicating that the user was successfully authenticated, then processing ends 68.

Conducting the authentication transaction 64 using SA data combined with the biometric authentication transaction 74, constitutes conducting a multi-factor authentication transaction conducted with two different types of authentication data simultaneously captured by the device 12 in accordance with the same authentication data requirement.

Figure 17:
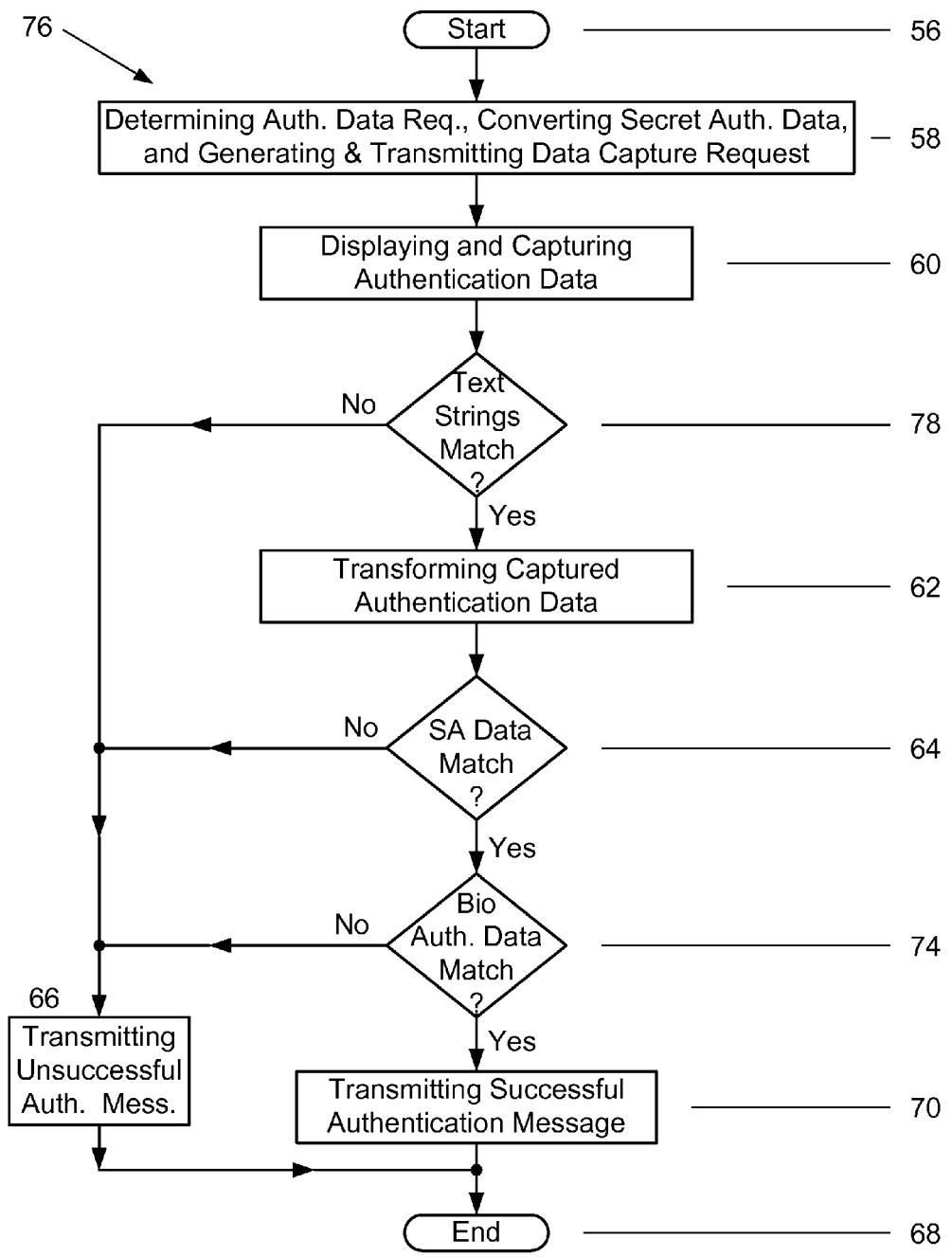
FIG. 17 is a flowchart illustrating another alternative exemplary process for improving the security of secret authentication data during authentication transactions.

The information shown in FIG. 17 is the same information shown in FIGS. 15 and 16 as described in more detail below. As such, features illustrated in FIG. 17 that are identical to features illustrated in FIGS. 15 and 16 are identified using the same reference numerals used in FIGS. 15 and 16.

FIG. 17 is a flowchart 76 illustrating another alternative exemplary process used by the ATC system 10 for improving the security of SA data during authentication transactions, using different types of authentication data simultaneously captured in accordance with a same authentication data requirement. This alternative process is similar to that shown in FIGS. 15 and 16. However, after receiving the captured authentication data, the AC system 14 continues processing by determining whether the text-strings in the captured authentication data match 78 the authentication text-strings included in the authentication data capture request message. When the text-strings in the captured authentication data do not match 78 the authentication text-strings included in the authentication data capture request message, processing continues by transmitting a message 66 to the requesting entity and the device 12 indicating that the user was not successfully authenticated. Otherwise, the AC system 14 continues processing by conducting an authentication transaction with the captured authentication data in accordance with operations 62, 64, 66, 68, 70, and 74 as described herein with regard to FIGS. 15 and 16.

Figure 18:
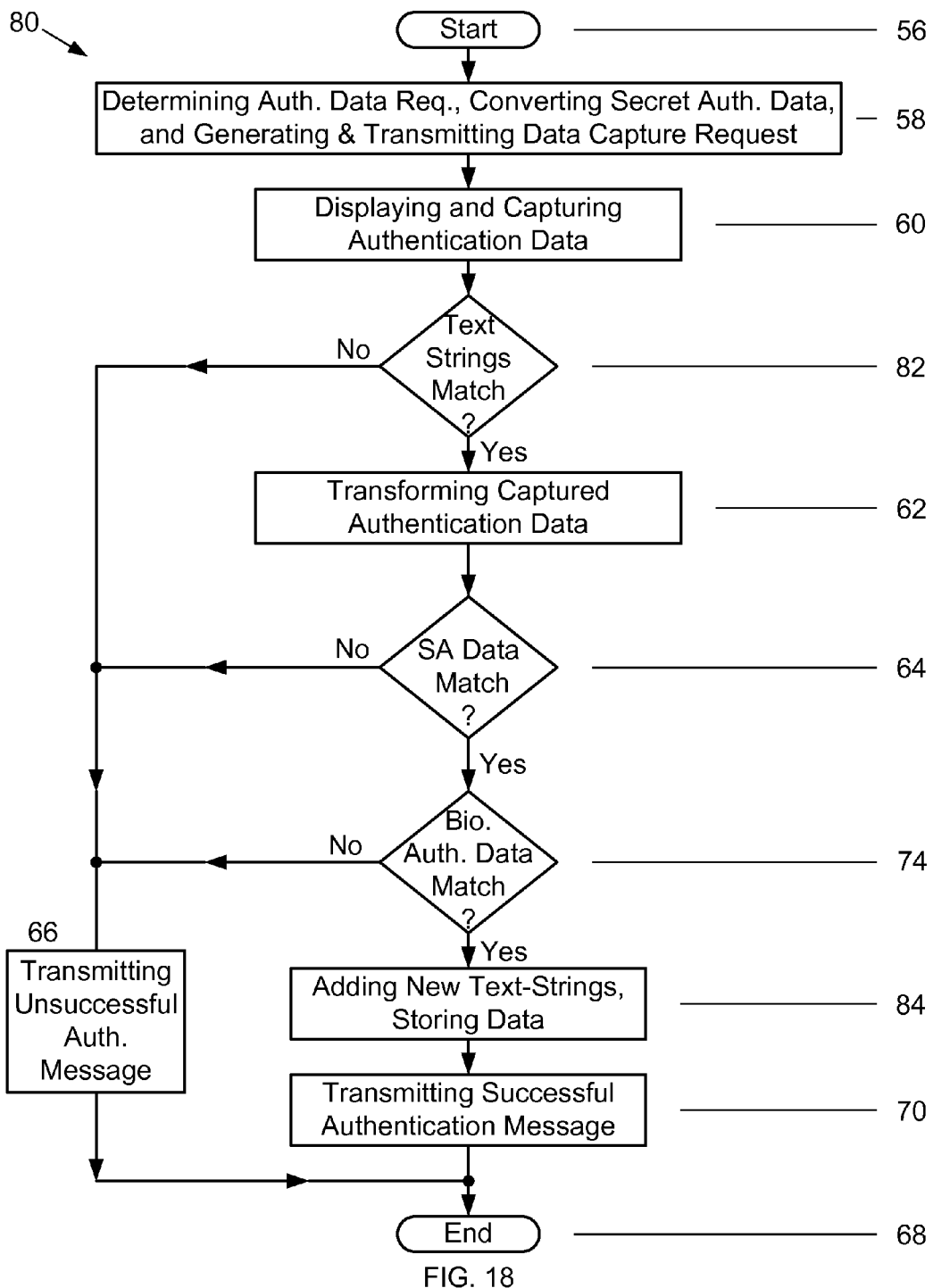
FIG. 18 is a flowchart illustrating yet another alternative exemplary process for improving the security of secret authentication data during authentication transactions.

The information shown in FIG. 18 is the same information shown in FIGS. 15 and 16 as described in more detail below. As such, features illustrated in FIG. 18 that are identical to features illustrated in FIGS. 15 and 16 are identified using the same reference numerals used in FIGS. 15 and 16.

FIG. 18 is a flowchart 80 illustrating yet another alternative exemplary process used by the ATC system 10 for improving the security of SA data during authentication transactions, using different types of authentication data simultaneously captured in accordance with a same authentication data requirement. This alternative process is similar to that shown in FIGS. 15 and 16. However, the AC system 14 converts the SA data into scrambled SA data using a combination of text-strings 24 and new text-strings 34, and adds the new text-string 34 to the enrollment text-string registry 22 upon successfully authenticating the user. After receiving a request to authenticate the user of the device 12 from a requesting entity, the AC system 14 continues by determining the authentication data requirement 58 to be SA data in the form of a PIN type pass-phrase of the user. The PIN type pass-phrase is 2587 thus the SA data is 2587.

The AC system 14 continues by determining the SA data of the user to be 2587, determining a different text-string 24 for at least one item of information in the SA data, determining key data 42 that corresponds to the at least one item of information, determining a different new text-string 34 for the other items of information in the SA data, and determining key data 42 that corresponds to the other items of information. Moreover, the AC system 14 determines a dummy text-string 24 for each item of key data 42 that does not correspond to an item of information. In this alternative exemplary process, the text-strings 24 are "Bad," "Ball," and "Run" which correspond to items of information "2," "5," and "7" and to the items of key data 2, 5, and 7. The new text string 34 is "True" which corresponds to the item of information "8" and to the item of key data 8. The dummy text-strings 24 and corresponding key data 42 are the same in this alternative process as described herein with regard to FIG. 15.

Next, the AC system 14 continues by converting the SA data into scrambled SA data of "Bad Ball True Run," and by associating each of the different text-strings 24 and the new text-string 34 with the corresponding items of information. The authentication text-strings and dummy text-strings 24 are also associated with the respective key data 42. Next, the AC system 14 continues by generating an authentication data capture request message 58 that includes at least the authentication, dummy, and new text-strings, and corresponding key data 42, and by transmitting the message 58 to the communications device 12.

After receiving the authentication data capture request message, the device 12 continues by displaying 60 the keypad 38 such that the authentication, dummy, and new text-strings are each associated with the corresponding key data 42, as shown in FIG. 9. Moreover, the device 12 displays a message in the message area 44 instructing the user to recite the text-strings corresponding to the items of information included in his SA data. After reading the message, the user continues by capturing authentication data 60 from his self with the device 12 by reciting the text-strings associated with the key data 42 that corresponds to each item of information in the SA data, in the order the items of information appear in the SA data. By doing so, the user captures the scrambled SA data "Bad Ball True Run" as authentication data. Next, the device 12 continues by transmitting the captured authentication data to the AC system 14.

After receiving the captured authentication data, the AC system 14 continues processing by determining whether the captured authentication data includes text-strings that match 82 the text-strings 24 included in the authentication data capture request message. That is, the combination of text-strings 24 and the new text-string 34 included in the message. When it is determined that text-strings in the captured authentication data do not match 82 the text-strings included in the authentication data capture request message, processing continues by transmitting a message 66 to the requesting entity and the device 12 indicating that the user was not successfully authenticated. Otherwise, the AC system 14 continues processing by conducting an authentication transaction.

The AC system 14 continues by transforming 62 the captured authentication data into SA data in the form of a PIN type pass-phrase. More specifically, the AC system 14 continues by transforming 62 the captured authentication data of "Bad," "Ball," "True," and "Run" into the items of information "2," "5," "8," and "7," respectively, and by determining that the transformed authentication data corresponds to the SA data of 2587.

Next, processing continues by determining whether the transformed authentication data matches 64 the SA data stored therein for the user by comparing the transformed authentication data against the stored SA data. When the transformed authentication data and stored SA data do not match 64, processing continues by transmitting a message 66 to the requesting entity and the device 12 indicating that the user was not successfully authenticated. Next, processing ends 68. However, when the transformed authentication data and stored SA data match 64, processing continues by conducting a biometric authentication transaction 74 with the biometric authentication data of the text-strings 24 "Bad," "Ball" and "Run" included in the captured authentication data. Biometric data for the new text-string 34 is not stored in the AC system 14, so biometric data for the new text-string "True" in the captured authentication data cannot be used in a biometric authentication transaction conducted by the AC system 14.

Next, the AC system 14 continues by determining whether the biometric data of the text-strings 24 included in the captured authentication data matches 74 the enrollment data for the same text-strings of the user stored therein. When the biometric data of the text-strings 24 included in the captured authentication data and enrollment data do not match 74, processing continues by transmitting a message 66 to the requesting entity and the device 12 indicating that the user was not successfully authenticated. Next, processing ends 68. However, when the biometric data of the text-strings 24 included in the captured authentication data and the enrollment data match 74, the identity of the user is successfully authenticated.

By virtue of successfully authenticating the user in an authentication transaction with SA data and in a biometric authentication transaction conducted with biometric data of the text-strings 24 included in the captured authentication data, where the captured authentication data constitutes scrambled SA data as well as biometric authentication data, the biometric data of the new text-strings 34 included in the captured authentication data is considered to be genuine. As a result, processing continues by adding 84 the new text-string "True" to the enrollment text-string registry 22 of the user and adding 84 the captured biometric data of the new text-string "True" to the enrollment data record of the user. By virtue of adding 84 the new text-string 34 to the enrollment text-string registry 22 of the user, the new text-string is stored in the enrollment text-string registry 22, and the enrollment text-string registry 22 is updated. Processing continues by conducting operation 70 as described herein with regard to FIGS. 15 and 16 and then processing ends 68.

By virtue of updating the enrolment text-string registry 22 as described herein with regard to FIG. 18, the user seamlessly provides new authentication data that may be used in future biometric authentication transactions as well as knowledge-based authentication transactions. As a result, the number of text-strings 24 that may be used to create scrambled or secretly coded SA data increases, which increases the difficulty of surreptitiously obtaining the SA data of users and thereby increases the difficulty for imposters to fraudulently conduct successful authentication transactions. In other alternative processes, any number of authentication text-strings 24 and any number of new text-strings 34 may be used to scramble the SA data that facilitates accurately judging biometric authentication data of the new text-strings 34 as genuine.

Although the SA data used in the process described with regard to FIG. 18 is in the form of a PIN type pass-phrase, in yet other alternative processes the SA data may be in the form of an answer 30 to a query 28. In such other alternative processes, the SA data may be in the form of an answer 30 of "San Diego." The text-string 24 "Bark" may be determined for the item of information "San," while a new text string 34 "Road" may be determined for the item of information "Diego." The text-string 24 "Bark" is the scrambled SA data used for conducting the biometric authentication transaction 74. After successfully biometrically authenticating the user, the new text-string "Road" may be added 84 to the enrollment text-string registry 22 and the captured biometric data of the new text-string "Road" may be added 84 to the enrollment data record of the user.

Although the alternative exemplary process described with regard to FIG. 18 determines whether the captured authentication data includes text-strings that match the text-strings 24 included in the authentication data capture request message at operation 82, yet other alternative exemplary processes may not include operation 82. In such other alternative exemplary processes, operation 62 is conducted after operation 60.

In yet other alternative processes, the new text-string 34 may be a sentence included in the authentication data capture request message that is displayed in the message area 44. For example, the sentence may be "The rain in Spain falls mainly in the plain." After the user is successfully authenticated as described herein at operations 64 and 74, the recited sentence is added 84 to the enrollment text-string registry 22 as a text-string 24, and the captured biometric data of the sentence is added 84 to the enrollment data record of the user.

After SA data is converted into scrambled SA data, the items of information may be associated with key data 42 associated with a same text-string 24. As shown in FIG. 12, when the SA data is the pass-phrase "CAB," the items of information "C," "A," and "B" may be associated with key data 42 having the same text-string 24. During an authentication transaction with the text-strings 24 as shown in FIG. 12, the user should capture authentication data 60 by repeatedly reciting "Nut," to yield "Nut Nut Nut." Imposters eavesdropping on users during such authentication transactions, that are also able to view or photograph the screen 18, may be able to surreptitiously determine the user's SA data and use it to conduct fraudulent transactions as well as to steal the user's identity.

Figure 19:
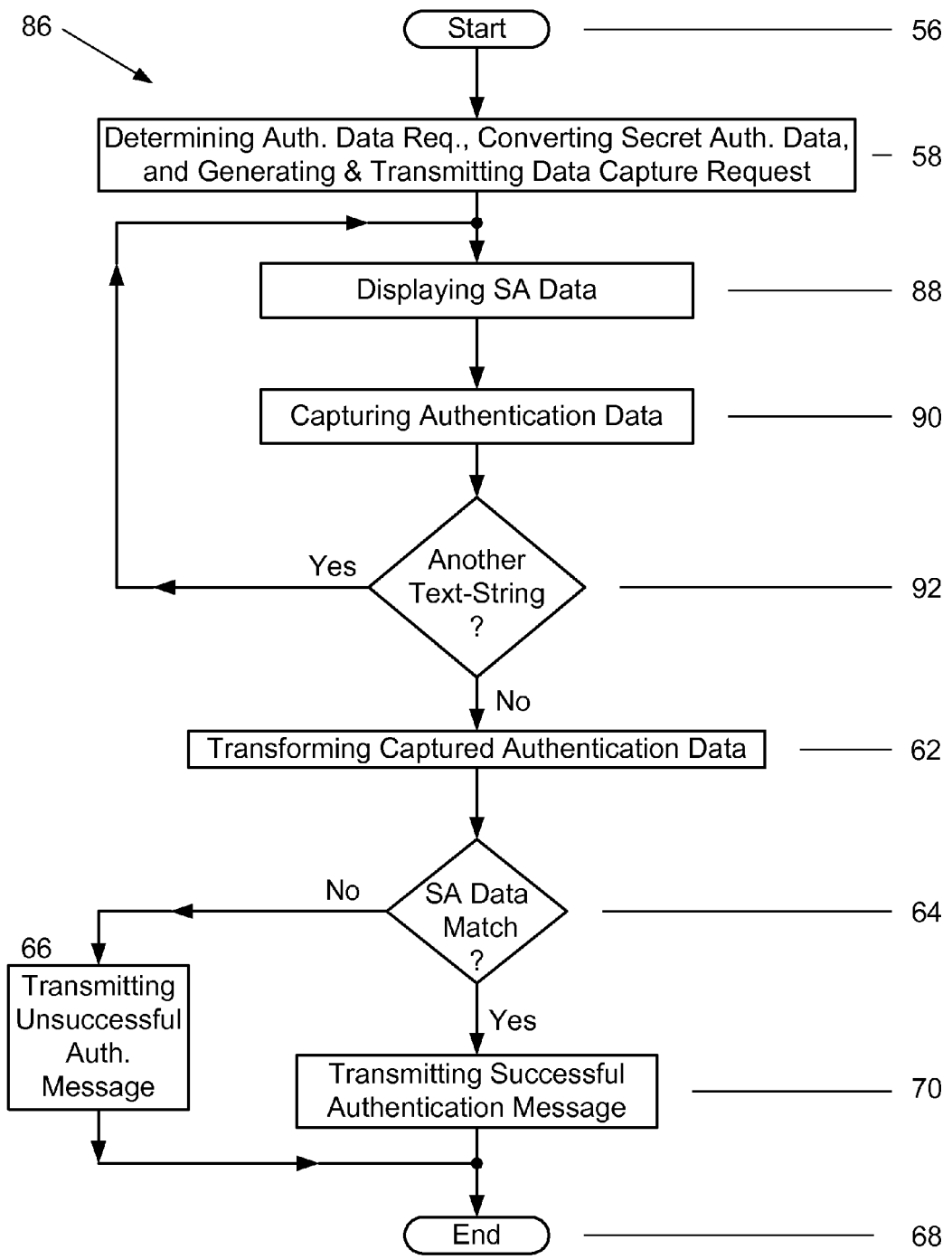
FIG. 19 is a flowchart illustrating yet another alternative exemplary process for increasing the security of secret authentication data during authentication transactions.

The information shown in FIG. 19 is the same information shown in FIG. 15 as described in more detail below. As such, features illustrated in FIG. 19 that are identical to features illustrated in FIG. 15 are identified using the same reference numerals used in FIG. 15.

FIG. 19 is a flowchart 86 illustrating yet another alternative exemplary process used by the ATC system 10 for improving the security of SA data during authentication transactions. This alternative process is similar to that shown in FIG. 15. However, the scrambled SA data is dynamically scrambled or secretly coded while capturing authentication data during an authentication transaction. The authentication data requirement is SA data in the form of the PIN type pass-phrase 2587. Thus, the SA data is 2587. After determining the authentication data requirement 58, the AC system 14 continues processing by determining a different text-string 24 for each item of information included in the SA data and determining key data 42 that corresponds to each item of information. The text-strings 24 determined for the items of information included in the SA data are "Run" "Pig," "Bark," and "Walk" which correspond to the items of information "2," "5," "8," and "7," and to the items of key data 2, 5, 8, and 7. Next, the AC system 14 continues by converting the SA data into scrambled SA data by associating each of the different authentication text-strings with the respective item of information included in the SA data. Thus, the scrambled or secretly coded SA data is "Run Pig Bark Walk." The text-strings 24 are also associated with the corresponding key data 42 numbers.

The AC system 14 also generates a set of dummy text-strings for each text string 24. In this alternative process the sets of dummy text-strings corresponding to the text-strings "Run" "Pig," "Bark," and "Walk" are "A Z B Y C X K M P," "D W E V F U B R S," "G T H S I R J U X," and "J Q K P L M Z S V." Each of the dummy text-strings included in a set is associated with different key data 42. However, the dummy text-strings included in a set cannot be associated with the key data 42 of the corresponding text-string. For example, the dummy text-strings included in the set "A Z B Y C X K M P," cannot be associated with the item of key data 2, because the corresponding text-string "Run" is associated with the item of key data 2.

The AC system 14 continues by generating an authentication data capture request message 58 that includes at least the authentication text-strings and the sets of dummy text-strings corresponding to each text-string, and corresponding key data 42, and transmitting the message to the communications device 12.

After receiving the authentication data capture request message, the device 12 continues by displaying 88 the keypad 38 such that the text-string corresponding to the first item of information included in the SA data, and the corresponding set of dummy text-strings, are associated with the corresponding key data 42 and keys 40. More specifically, the text-string "Run" is displayed on the key 40 associated with the item of key data 2, and the corresponding dummy text-strings are displayed on the other keys 40 associated with the other items of key data 42. The device 12 also displays a message in the message area 44 instructing the user to recite the text-string 24 corresponding to the first item of information in his SA data. After reading the message, the user continues by capturing authentication data 90 from his self with the device 12 by reciting the text-string "Run" associated with the key data 42 that corresponds to the first item of information in the SA data. After capturing the authentication data, the device 12 continues by automatically determining whether authentication data of another authentication text-string 92 is to be captured. Alternatively, the user may activate button 48 to cause the device 12 to determine whether authentication data of another authentication text-string 92 is to be captured.

When authentication data of another authentication text-string 92 is to be captured, processing continues by displaying 88 the keypad 38 such that the text-string representing the next item of information of the SA data and the corresponding set of dummy text strings are associated with the corresponding key data 42 and keys 40. More specifically, the text-string "Pig" is displayed on the key 40 associated with the item of key data 5, and the corresponding dummy text-strings are displayed on the other keys 40 associated with the other items of key data 42. The device 12 displays the message in the message area 44 instructing the user to recite the text-string corresponding to the next item of information in his SA data. After reading the message, the user continues by capturing authentication data 90 from his self with the device 12 by reciting the text-string "Pig" associated with the key data 42 that corresponds to the next, or second, item of information in the SA data. In this alternative exemplary process, operations 88, 90, and 92 are repeatedly conducted so that the user captures authentication data by reciting the text-strings "Bark" and "Walk."

When authentication data of another authentication text-string 92 is not to be captured, the device 12 continues by combining the recitations of "Run," "Pig," "Bark," and "Walk," into captured authentication data of "Run Pig Bark Walk." Thus, it should be understood that scrambled SA data of "Run Pig Bark Walk" is recited and captured as the authentication data. Next, the device 12 automatically continues by transmitting the captured authentication data to the AC system 14. Alternatively, the user may activate the button 48 to cause the device 12 to transmit the captured authentication data.

After receiving the captured authentication data, the AC system 14 continues processing by transforming 62 the captured authentication data into SA data in the form of a PIN type pass-phrase. More specifically, the AC system 14 continues by transforming 62 the captured authentication data of "Run Pig Bark Walk," into the items of information "2," "5," "8," and "7," respectively, and by determining that the transformed authentication data corresponds to SA data of 2587. Next, processing continues by conducting operations 64, 66, 68, and 70 as described herein with regard to FIG. 15.

Displaying a different version of the scrambled SA data for each item of information included in the SA data, dynamically scrambles or secretly codes the scrambled SA data itself during authentication transactions. By virtue of dynamically scrambling the SA data during authentication transactions, the SA data is more unpredictable to imposters and is thus less likely to be surreptitiously obtained by them during authentication transactions. Moreover, by virtue of dynamically scrambling the scrambled SA data itself during authentication transactions, the chance that users will recite the same text-string for different items of information in the SA data is facilitated to be reduced.

The exemplary processes described herein with regard to FIGS. 15-18 include displaying and capturing scrambled SA data at operation 60. Alternatively, the processes described herein with regard to FIGS. 15-18 may display and capture scrambled SA data in accordance with operations 88, 90, and 92 as described herein with regard to FIG. 19.

Although the alternative exemplary processes described herein with regard to FIGS. 16-18 conduct a SA data-based authentication transaction at operation 64 before conducting the biometric authentication transaction at operation 74, in yet other alternative processes operations 64 and 74 may be conducted in any order. Converting SA data into scrambled SA data as described herein may also be referred to as scrambling the SA data.

Although the exemplary processes described herein simultaneously capture SA data and biometric authentication data with the device 12 in accordance with a same authentication data requirement, in other alternative exemplary processes more than one type of biometric authentication data may be captured while capturing the SA data. For example, voice and face biometric may be captured while reciting the scrambled SA data. In such other alternative processes, the device 12 captures an image of the face of the user while the user recites the scrambled SA data. In yet other alternative exemplary processes, the device 12 may simultaneously capture a video stream of the user's face, including mouth movements while the user recites the scrambled SA data. In such other alternative processes, the synchronization of the voice biometric data with mouth movements in the video stream may be evaluated to provide an additional level of biometric authentication. Thus, it should be understood that different types of biometric authentication data may be simultaneously captured by the device 12 in accordance with a same authentication data requirement.

In each embodiment, the above-described methods for improving the security of secret authentication data during authentication transactions facilitate reducing chances that imposters will be able to surreptitiously obtain the secret authentication data of individuals, facilitate increasing the trustworthiness of authentication transaction results, facilitate increasing liveness detection of users conducting remote authentication transactions, and facilitate increasing the accuracy performance of authentication systems. More specifically, secret authentication data of a user is secretly coded or scrambled by associating a different text-string with each item of information included in the secret authentication data. The secret authentication data is scrambled differently for each authentication transaction and is recited in accordance with the differently scrambled authentication data by the user during each authentication transaction. Moreover, the scrambled secret authentication data itself may be dynamically scrambled during authentication transactions. Furthermore, new text-strings may be added to a personal authentication lexicon of the user after successfully authenticating the user. As a result, the security of secret authentication data is facilitated to be improved, and the chances that user identities will be stolen are facilitated to be reduced. Furthermore, ATC system operation facilitates reducing the time and costs associated with safeguarding secret authentication data, generating trustworthy authentication results, and detecting the liveness of users during remote authentication transactions.

Exemplary embodiments of methods for improving the security of secret authentication data during authentication transactions are described above in detail. The methods are not limited to use with the specific authentication computer systems described herein, but rather, the methods can be utilized independently and separately from other authentication computer components described herein. For example, the methods for improving the security of secret authentication data described herein may be implemented in most authentication systems and may be used for a wide range of authentication scenarios, including unlocking automobile doors. Moreover, the invention is not limited to the embodiments of the methods described above in detail. Rather, other variations of the methods may be utilized within the spirit and scope of the claims.

While the invention has been described in terms of various specific embodiments, those skilled in the art will recognize that the invention can be practiced with modification within the spirit and scope of the claims.

What is claimed is:

1. A method for authenticating users comprising:
   determining, by a communications device, text-strings for display thereon, each text-string corresponding to an item of information included in user secret authentication data, wherein at least one of the text-strings is included in a text-string registry and at least one of the text-strings is a new text-string;
   authenticating, by the communications device, a user with authentication data simultaneously captured from the user with the communications device as the result of the user reciting the text-strings, the captured authentication data including at least different biometric data types; and
   adding, by the communications device, the new text-string to the text-string registry after successfully authenticating the user.

2. The method for authenticating users in accordance with claim 1, the biometric data types comprising voice and face biometric data, said authenticating step comprising:
   transforming the captured voice biometric data into secret authentication data; and
   comparing the secret authentication data against the user secret authentication data.

3. The method for authenticating users in accordance with claim 2, said authenticating step further comprising determining whether the captured voice and face biometric data match biometric data included in a user enrollment data record stored in an authentication computer system when the secret authentication data matches the user secret authentication data.

4. The method for authenticating users in accordance with claim 1, said authenticating step comprising evaluating synchronization between the different authentication data types included in the captured authentication data.

5. The method for authenticating users in accordance with claim 1, said determining step comprising:
   randomly selecting each text-string from a text-string registry; or
   determining each text-string to be a least recently used text-string in the text-string registry.

6. The method for authenticating users in accordance with claim 1, further comprising:
   determining additional text-strings; and
   associating a text-string or an additional text-string with each key in a keypad, each key being associated with key data, wherein the user recites the text-strings associated with key data corresponding to the items of information.

7. An apparatus for authenticating users comprising:
   a processor; and
   a memory configured to store at least enrollment data records, said apparatus being associated with a network and said memory being coupled to said processor and having instructions stored thereon which, when executed by said processor, cause said processor to:
   determine text-strings for display on said apparatus, each text-string corresponding to an item of information included in user secret authentication data, wherein at least one of the text-strings is included in a text-string registry and at least one of the text-strings is a new text-string;
   authenticate a user with authentication data simultaneously captured from the user with said apparatus as the result of the user reciting the text-strings, the captured authentication data including at least different biometric data types; and
   add the new text-string to the text-string registry after successfully authenticating the user.

8. An apparatus for authenticating users in accordance with claim 7 wherein said processor is further caused to:
   transform captured voice biometric data into secret authentication data when the captured biometric data includes voice and face biometric data; and
   compare the secret authentication data against the user secret authentication data.

9. An apparatus for authenticating users in accordance with claim 8, wherein said processor is further caused to determine whether the captured voice and face biometric data match biometric data included in a user enrollment data record stored in an authentication computer system when the secret authentication data matches the user secret authentication data.

10. An apparatus for authenticating users in accordance with claim 7, wherein said processor is further caused to evaluate synchronization between the different authentication data types included in the captured authentication data.

11. An apparatus for authenticating users in accordance with claim 7, wherein said processor is further caused to:
    randomly select each text-string from a text-string registry; or
    determine each text-string to be a least recently used text-string in the text-string registry.

12. An apparatus for authenticating users in accordance with claim 7, wherein said processor is further caused to:
    determine additional text-strings; and
    associate a text-string or an additional text-string with each key in a keypad, each key being associated with key data, wherein the user recites the text-strings associated with key data corresponding to the items of information.

13. A computer program recorded on a non-transitory computer-readable recording medium included in a computer system for authenticating users, the computer program for causing the computer system to:
    determine text-strings for display on said apparatus, each text-string corresponding to an item of information included in user secret authentication data, wherein at least one of the text-strings is included in a text-string registry and at least one of the text-strings is a new text-string;
    authenticate a user with authentication data simultaneously captured from the user with said apparatus as the result of the user reciting the text-strings, the captured authentication data including at least different biometric data types; and
    add the new text-string to the text-string registry after successfully authenticating the user.

14. A computer program in accordance with claim 13 for further causing the computer system to:
    transform captured voice biometric data into secret authentication data when the captured biometric data includes voice and face biometric data; and
    compare the secret authentication data against the user secret authentication data.

15. A computer program in accordance with claim 14 for further causing the computer system to determine whether the captured voice and face biometric data match biometric data included in a user enrollment data record stored in an authentication computer system when the secret authentication data matches the user secret authentication data.

16. A computer program in accordance with claim 13 for further causing the computer system to evaluate synchronization between the different authentication data types included in the captured authentication data.

17. A computer program in accordance with claim 13 for further causing the computer system to:
   randomly select each text-string from a text-string registry; or
   determine each text-string to be a least recently used text-string in the text-string registry.

18. A computer program in accordance with claim 13 for further causing the computer system to associate a text-string or an additional text-string with each key in a keypad, each key being associated with key data, wherein the user recites the text-strings associated with key data corresponding to the items of information.

19. A method for authenticating users comprising:
   determining, by a communications device, text-strings for display thereon, each text-string corresponding to an item of information included in user secret authentication data, wherein at least one of the text-strings is included in a text-string registry and at least one of the text-strings is a new text-string;
   authenticating, by the communications device, a user with face and voice biometric data simultaneously captured from the user with the communications device as the result of the user reciting the text-strings; and
   adding, by the communications device, the new text-string to the text-string registry after successfully authenticating the user.

* * * * *